United States Patent
Ushiki et al.

(10) Patent No.: US 7,889,694 B2
(45) Date of Patent: Feb. 15, 2011

(54) MOBILE COMMUNICATION APPARATUS AND CHANNEL SWITCHING METHOD FOR AD-HOC COMMUNICATION

(75) Inventors: Kazumasa Ushiki, Kawasaki (JP); Kensuke Sawada, Kawasaki (JP); Mitsunori Fukazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 764 days.

(21) Appl. No.: 11/822,527

(22) Filed: Jul. 6, 2007

(65) Prior Publication Data

US 2008/0008132 A1    Jan. 10, 2008

(30) Foreign Application Priority Data

Jul. 7, 2006    (JP) .............................. 2006-188270

(51) Int. Cl.
  *H04Q 7/00* (2006.01)
(52) U.S. Cl. ....................................... 370/329; 370/328
(58) Field of Classification Search ................. 370/328, 370/329, 331, 338; 455/41.2, 507, 509, 552.1
See application file for complete search history.

(56) References Cited

U.S. PATENT DOCUMENTS

| | | | |
|---|---|---|---|
| 6,240,080 B1 | 5/2001 | Okanoue et al. | |
| 7,221,667 B2 | 5/2007 | Hori et al. | |
| 7,433,691 B1 * | 10/2008 | White | 455/445 |
| 7,636,343 B2 * | 12/2009 | Mizukoshi | 370/338 |
| 2002/0155846 A1 * | 10/2002 | Shiraga | 455/456 |
| 2003/0053437 A1 | 3/2003 | Bahl et al. | |
| 2006/0215611 A1 * | 9/2006 | Nakagawa et al. | 370/332 |
| 2007/0109989 A1 * | 5/2007 | Nakagawa et al. | 370/328 |

FOREIGN PATENT DOCUMENTS

| | | |
|---|---|---|
| EP | 1 804 437 A1 | 7/2007 |
| JP | H11-55318 | 2/1999 |
| JP | 2004-128785 | 4/2004 |
| JP | 2004-248180 | 9/2004 |
| WO | WO 2006/016330 A1 | 2/2006 |
| WO | WO 2006016330 * | 2/2006 |

OTHER PUBLICATIONS

European Office Communication dated Nov. 27, 2007.
International Search Report dated Dec. 19, 2005.

* cited by examiner

*Primary Examiner*—Dwayne D Bost
*Assistant Examiner*—Myron Wyche
(74) *Attorney, Agent, or Firm*—Murphy & King, P.C.

(57) ABSTRACT

A communication apparatus and method for channel switching for ad-hoc communication provides effective utilization of an infrastructure communication channel while preventing a deterioration in the quality of the infrastructure communication affected by a transmission signal used in the ad-hoc communication. Typically, the number of channels that can be used for a second communication is increased.

3 Claims, 12 Drawing Sheets

MOBILE COMMUNICATION APPARATUS AND CHANNEL SWITCHING METHOD FOR AD-HOC COMMUNICATION

BACKGROUND

The present apparatus and method relate to mobile communication apparatuses and channel switching methods for ad-hoc communication. This apparatus and method comprise a mobile phone terminal, a PHS (the Personal Handy phone System) terminal, a portable personal computer, or an in-vehicle communication apparatus and channel switching method for ad-hoc communication that uses such a mobile communication apparatus, and they can communicate with an infrastructure communication mode and an ad hoc communication mode while moving.

DESCRIPTION OF THE RELATED ART

In general, it is well known that wireless local-area network (LAN) systems include an infrastructure communication mode and an ad-hoc communication mode. In the infrastructure communication mode, each of a plurality of portable stations (for example, personal computers) is operable to communicate via a base station (that is, a wireless access point) located in a fixed position. In the ad-hoc communication mode, neighboring stations are operable to directly perform wireless communication with each other.

In general wireless LAN-systems, the infrastructure communication mode and the ad-hoc communication mode do not take into consideration communication to be performed by mobile communication apparatuses used in vehicles, such as automobiles, moving at a high speed. Sufficient work has not been undertaken for the realization of infrastructure communication and ad-hoc communication intended to be used by mobile communication apparatuses that perform communication while moving at a high speed.

A method for optimally switching a wireless communication medium mode is described in Japanese Unexamined Patent Application Publication No. 2004-248180 in which communication state information on a wireless communication medium is accurately collected and then it is determined whether to perform communication in an infrastructure communication mode or an ad-hoc communication mode in accordance with the communication state information.

A wireless LAN communication system capable of achieving automatic switching between an infrastructure communication mode and an ad-hoc communication mode under specific conditions is described in Japanese Unexamined Patent Application Publication No. 2004-128785. A mobile terminal operable to connect to an infrastructure network, which is a permanent network, and to an ad-hoc network, which is a temporal network constituted only by a plurality of terminals, while moving between the infrastructure network and the ad-hoc network and a method for controlling the mobile terminal are described in Japanese Unexamined Patent Application Publication No. 11-55318.

Wireless communication systems are operable to implementing communication in both the infrastructure communication mode, in which a mobile communication apparatus that performs communication while moving at a high speed performs wireless communication via a base station (that is, an access point), and the ad-hoc communication mode, in which mobile communication apparatuses that perform communication while moving at a high speed directly perform wireless communication with each other. When an infrastructure communication channel used by a mobile communication apparatus for communication with a base station and an ad-hoc communication channel used for communication between mobile communication apparatuses are used, it is necessary to further increase the number of channels that can be used for ad-hoc communication while preventing ad-hoc communication from interfering with infrastructure communication.

SUMMARY

Accordingly, one aspect of the present invention comprises an apparatus and method that achieves effective utilization of an infrastructure communication channel while preventing a deterioration in the quality of a first (that is infrastructure) communication affected by a transmission signal used in a second (that is ad-hoc) communication. Preferably, the number of channels that can be used for a second communication is increased.

According to one aspect of the present apparatus, a mobile communication apparatus operable to perform a first wireless communication via a base station and a second wireless communication directly communicating with a different mobile communication apparatus is provided. The mobile communication apparatus includes a communication channel recognition unit that recognizes an infrastructure communication channel that does not interfere with a first communication performed within a wireless area of the base station among a plurality of first communication channels allocated for the first communication. The apparatus also includes a communication channel substitution controller that control a channel so that a second communication is switched to the first communication channel recognized by the communication channel recognition unit and the second communication uses the first communication channel.

The communication channel recognition unit may recognize a first communication channel that can be used for a second communication in accordance with a reception state of a signal in a common control channel transmitted from the base station or channel identification information indicating a first communication channel transmitted from the base station using the common control channel.

The communication channel recognition unit may recognize a first communication channel that can be used as a substitute in accordance with information indicating that a first communication is performed or channel identification information indicating that a channel that is used for the first communication. The first communication channel identification information is preferably transmitted from a different mobile communication apparatus using a second communication channel.

The communication channel recognition unit may recognize a first communication channel that can be used for a second communication in accordance with position information of each of a plurality of base stations stored in advance. The channel identification information indicates a first communication channel that is used by each base station, and present position information is obtained by a positioning device.

The communication channel recognition unit may recognize a first communication channel that can be used for a second communication in accordance with a reception state of a synchronization establishing signal transmitted from the base station or channel identification information indicated by the synchronization establishing signal.

According to another aspect of the present method, a channel switching method for performing communication in a first communication which the mobile communication apparatus performs wireless communication via a base station and a second communication which the mobile communication apparatus directly performs wireless communication with a different mobile communication apparatus is provided. The channel switching method includes: (a) recognizing a first communication channel that does not interfere with a first communication performed within a wireless area of the base station among a plurality of first communication channels allocated for first communication; and (b) controlling such that a channel used for ad-hoc communication is switched to the first communication channel recognized in the step (b) and the second communication uses the first communication channel.

According to another aspect of the present apparatus, a mobile communication apparatus operable to communicate in a first communication mode via a base station and a second communication mode directly communicating with a different mobile communication apparatus is provided. The mobile communication apparatus includes a communication channel recognition unit that recognizes an unused channel for the first communication mode that does not interfere with communication in the first communication mode performed within a wireless area of the base station among a plurality of channels for the first communication mode.

The apparatus also includes a communication channel substitution controller that controls such that a channel used for the second communication mode is switched to the unused channel for the first communication mode recognized by the communication channel recognition unit and the communication in the second communication mode uses the unused channel for the first communication mode.

DETAILED DESCRIPTION OF THE EMBODIMENTS

Figure 1A:
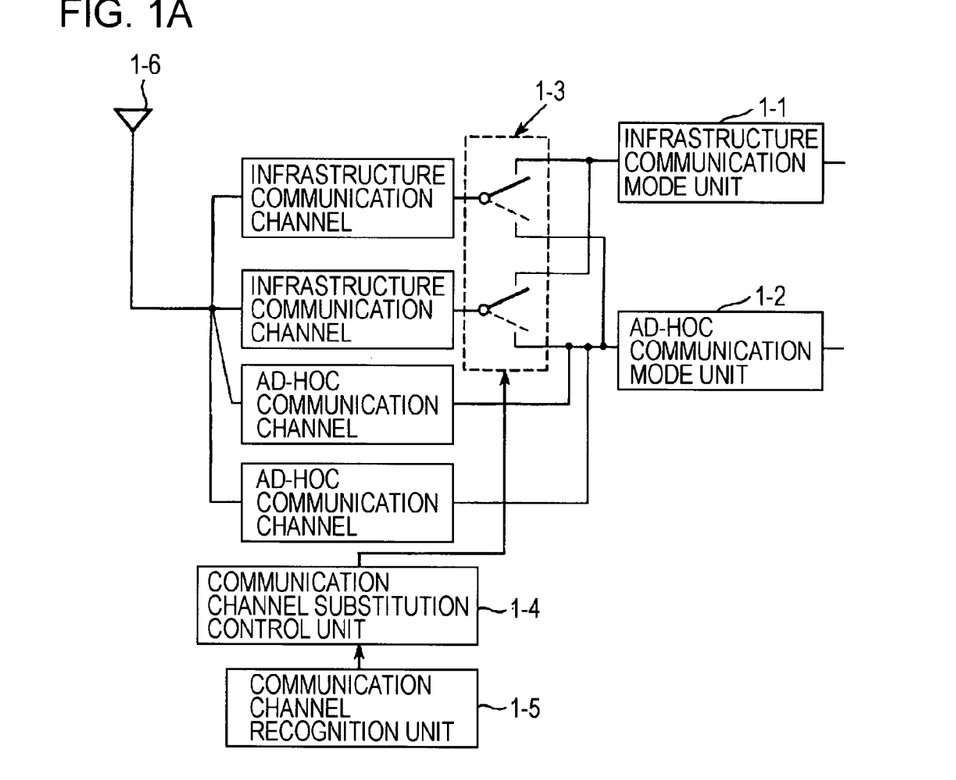
FIG. 1 shows main functional units of a mobile communication apparatus according to an embodiment of the present apparatus.

FIG. 1A shows exemplary main functional units of a mobile communication apparatus according to an embodiment of the present apparatus. Referring to FIG. 1A, the mobile communication apparatus includes an infrastructure communication mode unit 1-1, an ad-hoc communication mode unit 1-2, a selector switch 1-3, a communication channel substitution control unit 1-4, a communication channel recognition unit 1-5, and an antenna 1-6.

The infrastructure communication mode unit 1-1 performs wireless communication via a base station. The ad-hoc communication mode unit 1-2 directly performs wireless communication with another mobile communication apparatus. The selector switch 1-3 performs switching of whether an infrastructure communication channel is used for infrastructure communication or ad-hoc communication. The communication channel substitution control unit 1-4 controls switching of the selector switch 1-3. The communication channel recognition unit 1-5 recognizes an available infrastructure communication channel.

Furthermore, this apparatus provides a signal processing unit or the like to process a communication signal transmitted and received with the infrastructure communication mode unit 1-1 and the ad-hoc communication mode unit 1-2 in a baseband band.

However, since the signal processing unit or the like is not directly related to the present apparatus, the signal processing unit or the like is not shown in FIG. 1A.

When the mobile communication apparatus (hereinafter, referred to as a "terminal") performs communication in a place remote from a wireless area of the base station or when an infrastructure communication channel (that is, an unused infrastructure communication channel) which is not used in the wireless area of the base station exists, the communication channel recognition unit 1-5 recognizes that an infrastructure communication channel (that is, an unused infrastructure communication channel) that can be used for ad-hoc communication exists, and informs the communication channel substitution control unit 1-4 of the infrastructure communication channel that it can be used as a substitute.

When the infrastructure communication channel that can be used as a substitute reported by the communication channel recognition unit 1-5 exists, the communication channel substitution control unit 1-4 controls the selector switch 1-3 to switch the communication mode to the ad-hoc communication mode so that the ad-hoc communication mode unit 1-2 can perform ad-hoc communication using the infrastructure communication channel that can be used as a substitute.

Figure 1B:
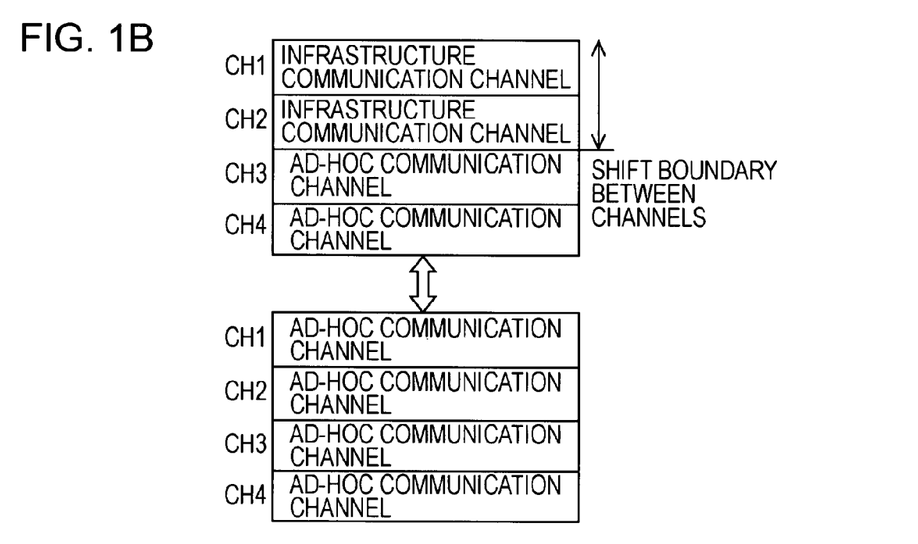

Accordingly, as shown in FIG. 1B, this apparatus can be used, and communication channels CH1 and CH2 can be allocated to infrastructure communication channels as substitutes for ad-hoc communication channels.

This apparatus can be used in combination with communication channels CH1, CH2, CH3, CH4 as ad-hoc communication channels whereas only communication channel CH3, CH4 were allocated to ad-hoc communication channels in an original device. Consequently, the number of available ad-hoc communication channels can be increased without affecting infrastructure communication with the base station.

An infrastructure communication channel and an ad-hoc communication channel may be time-division multiplexed at the same frequency or may use different frequency bands. In addition, an infrastructure communication channel and an ad-hoc communication channel that are time-division multiplexed channels using shorter time slots or that are channels using a carrier sense multiple access (CSMA) method or the like. They may be used in a plurality of mobile communication apparatuses.

Terminals for recognizing an infrastructure communication channel that can be used as a substitute will be described as follows. A first embodiment of the present system will be described with reference to FIG. 2.

Figure 2:
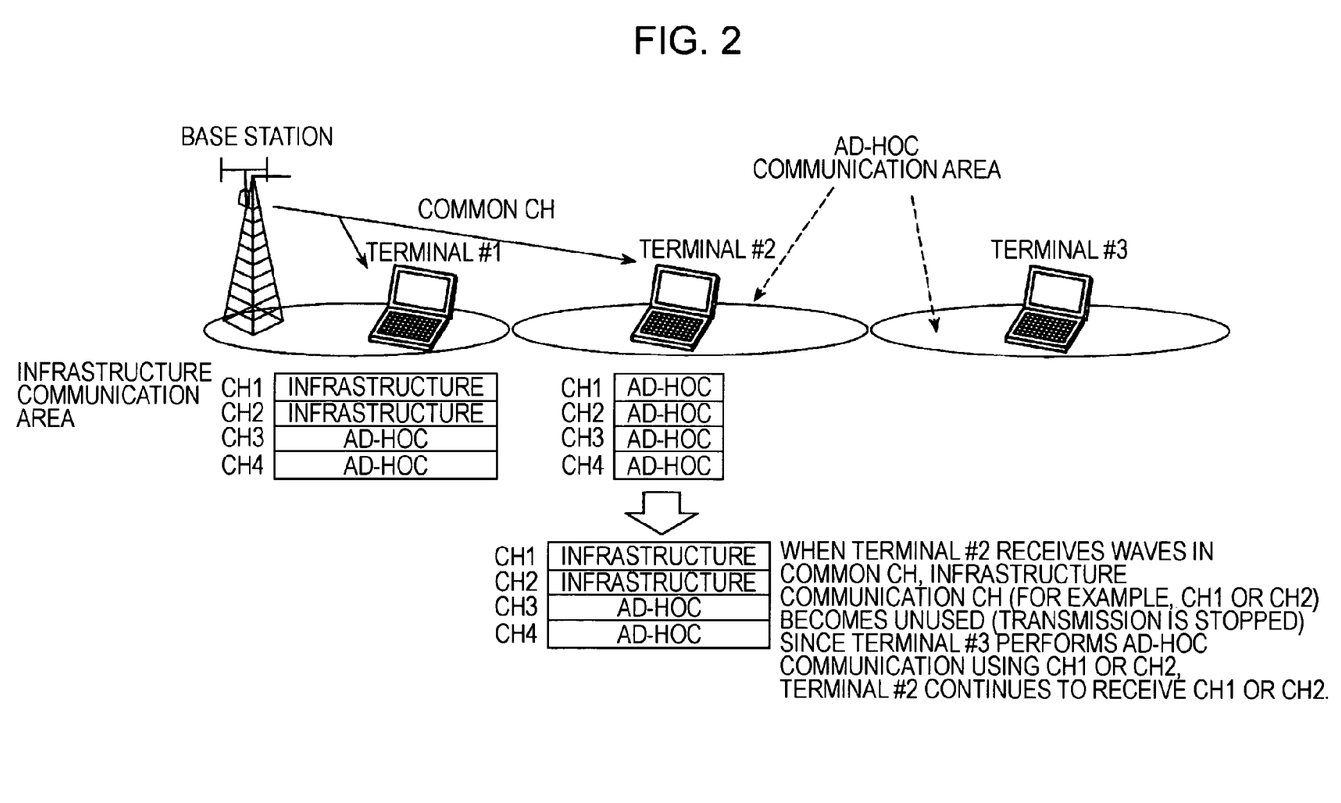
FIG. 2 is an explanatory diagram of a first embodiment of the present apparatus.

Referring to FIG. 2, a terminal #1 is located within a wireless area of a base station, that is, within the range of an infrastructure communication area. A terminal #2 is located outside the infrastructure communication area and is approaching the infrastructure communication area. A terminal #3 is located in an area remote from the infrastructure communication area.

In the wireless communication system according to the first embodiment, a base station transmits broadcast information to let a terminal recognize the existence of a base station at a transmission power level stronger than the level of transmission power used in ad-hoc communication between terminals with the common control channel which all terminals can recognize.

When the terminal #2 is located at a position that is sufficiently far from the infrastructure communication area, the broadcast information transmitted from the base station using the common control channel does not reach the terminal #2. Thus, the terminal #2 recognizes that using the infrastructure communication channel CH1 or CH2 for ad-hoc communication does not interfere with infrastructure communication. The infrastructure communication channel CH1 or CH2 is used for ad-hoc communication. Thus, the channels CH1 to CH4 can be used for ad-hoc communication.

The broadcast information transmitted from the base station using the common control channel does not reach the terminal #3. Thus, the terminal #3 recognizes that the terminal #3 is located at a position sufficiently far from the infrastructure communication area. Similarly to the case of the terminal #2, the infrastructure communication channel CH1 or CH2 is used for ad-hoc communication. Thus, for example, the terminal #3 performs ad-hoc communication with the terminal #2 using the infrastructure communication channel CH1 or CH2.

However, when the terminal #2 enters the area where the information transmitted from the base station using the common control channel reaches during the use of the infrastructure communication channel CH1 or CH2 for ad-hoc communication, the terminal #2 recognizes that the use of the infrastructure communication channel CH1 or CH2 for ad-hoc communication interferes with infrastructure communication in accordance with a reception state of the common control channel transmitted from the base station. Thus, the terminal #2 stops transmission in the ad-hoc communication using the infrastructure communication channel CH1 or CH2, and performs transmission in ad-hoc communication using the ad-hoc communication channel CH3 or CH4.

Since the terminal #3 is operable to continue ad-hoc communication using the infrastructure communication channel CH1 or CH2, the terminal #2 continues to receive the infrastructure communication channel CH1 or CH2 from the terminal #3.

Figure 3:
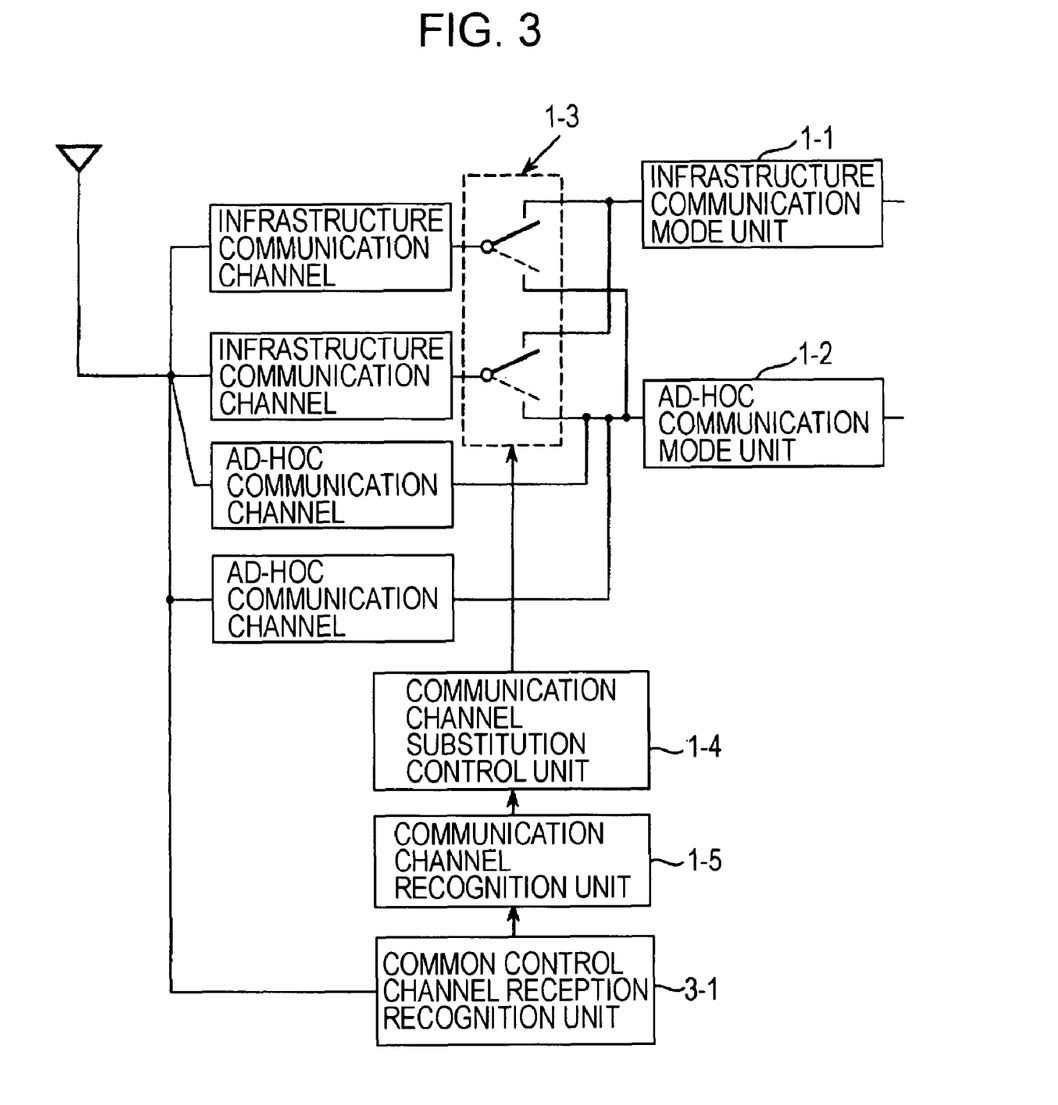
FIG. 3 shows exemplary main functional units of a terminal used in the first embodiment.

FIG. 3 shows main functional units of a terminal used in the first embodiment. The functional units shown in FIG. 3 are different from the functional units shown in FIG. 1 in that a common control channel reception recognition unit 3-1 is also included. The common control channel reception recognition unit 3-1 recognizes that the base station is located near the terminal in accordance with reception of a signal in the common control channel transmitted from the base station, and informs the communication channel recognition unit 1-5 of recognition information indicating the recognition of the existence of the base station. The communication channel recognition unit 1-5 recognizes that an infrastructure communication channel may be used as a substitute in accordance with the recognition information transmitted from the common control channel reception recognition unit 3-1.

A second embodiment of the present system will be described. In the second embodiment, similarly to the first embodiment, the base station transmits, using the common control channel that can be recognized by all the terminals in the wireless communication system, information for causing a terminal to recognize channel identification information indicating an infrastructure communication channel that is being used by the base station at a transmission power level stronger than the level of transmission power used for ad-hoc communication between terminals.

The terminal always monitors the common control channel, and uses an infrastructure communication channel other than the channel indicated by the channel identification information transmitted from the base station using the common control channel for ad-hoc communication. When the terminal receives from the base station channel identification information indicating the infrastructure communication channel that is being used, the ad-hoc communication using the infrastructure communication channel is stopped. Then, the terminal continues ad-hoc communication using an ad-hoc communication channel or an infrastructure communication channel that can be used for ad-hoc communication, which is other than the infrastructure communication channel indicated by the channel identification information.

Figure 4:
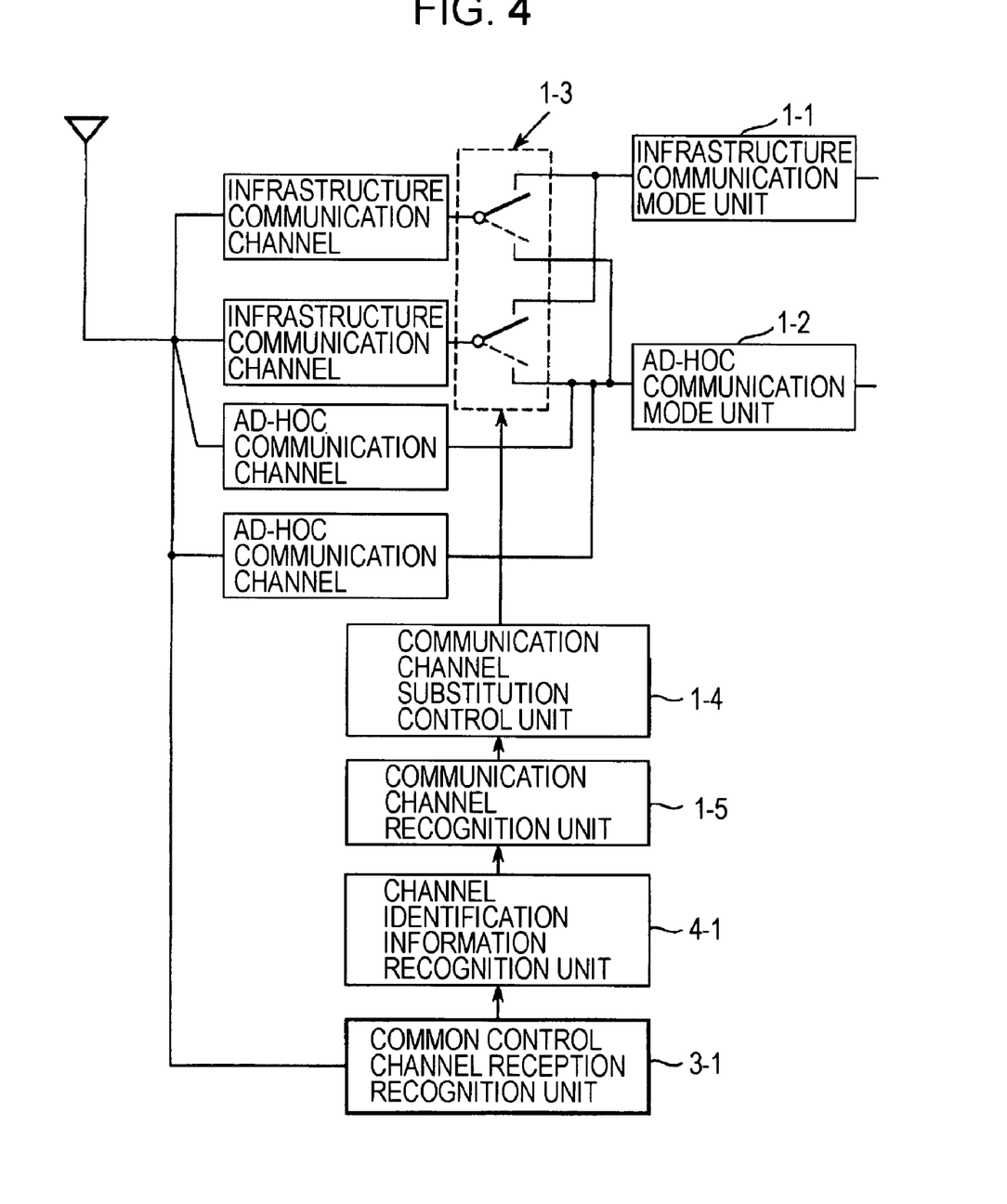
FIG. 4 shows exemplary main functional units of a terminal used in a second embodiment of the present apparatus.

FIG. 4 shows main functional units of a terminal used in the second embodiment. The main functional units shown in FIG. 4 are different from the main functional units shown in FIG. 3 in that a channel identification information recognition unit 4-1 that recognizes channel identification information indicating an infrastructure communication channel that is being used is also included. The channel identification information recognition unit 4-1 recognizes an infrastructure communication channel that is being used in accordance with channel identification information transmitted from the base station using the common control channel, and informs the communication channel recognition unit 1-5 of recognition information indicating the recognition of the infrastructure communication channel that is being used. The communication channel recognition unit 1-5 recognizes an infrastructure communication channel that can be used as a substitute in accordance with the recognition information.

Figure 5:
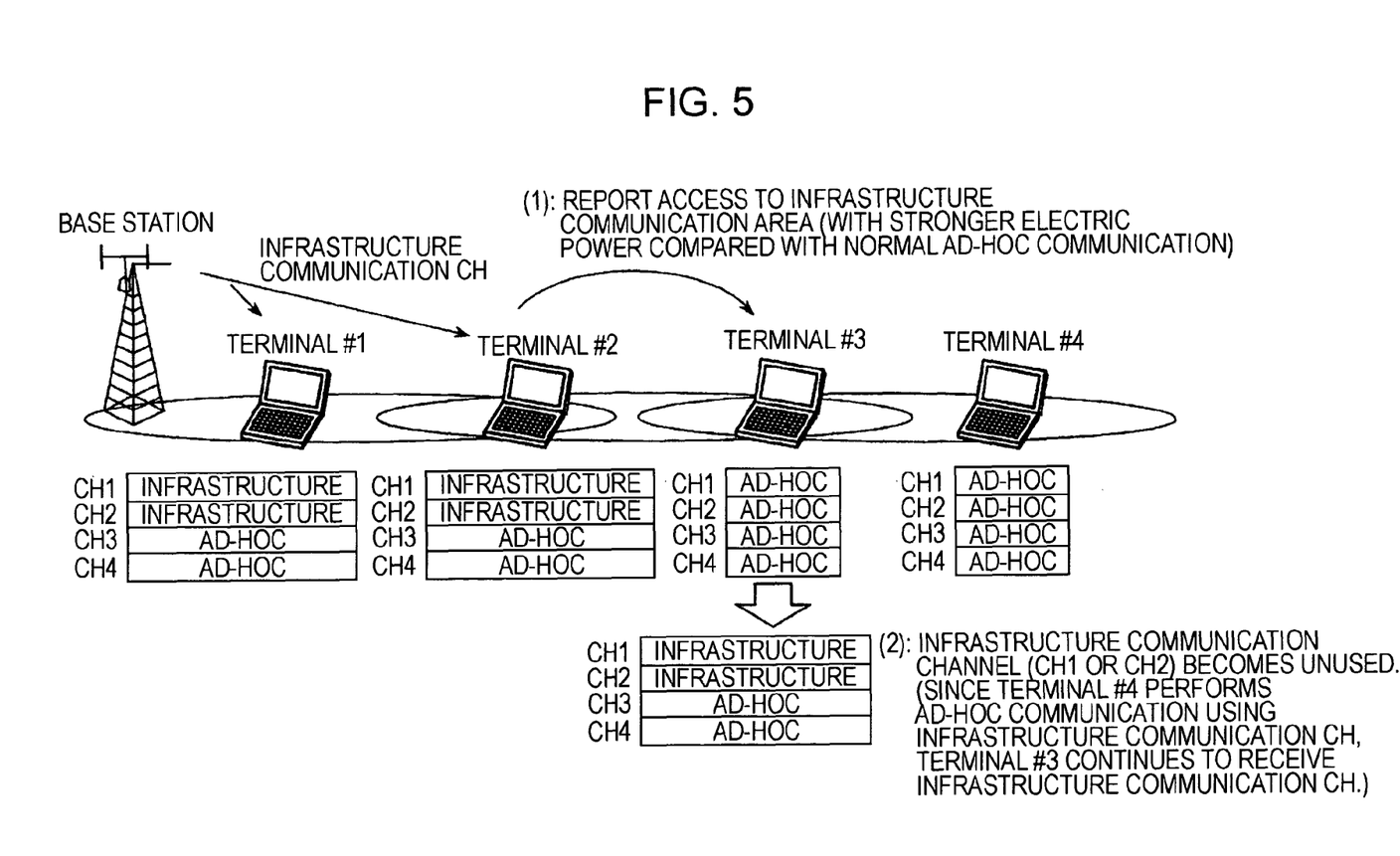
FIG. 5 is an explanatory diagram of a third embodiment of the present apparatus.

A third embodiment of the present apparatus will be described with reference to FIG. 5. Referring to FIG. 5, the terminals #1 and #2 are located within the wireless area of the base station, that is, within the range of the infrastructure communication area. The terminal #3 is located at a position close to the infrastructure communication area outside the infrastructure communication area. The terminal #4 is located in an area remote from the infrastructure communication area.

Since the terminals #3 and #4 receive no information, the terminals #3 and #4 use the infrastructure communication channel CH1 or CH2 for ad-hoc communication. When starting infrastructure communication with the base station using an infrastructure communication channel, the terminal #2 informs the neighboring terminal #3 of information indicating that infrastructure communication performed using an ad-hoc communication channel. The information transmitted from the terminal #2 using the ad-hoc communication channel is transmitted at a transmission power level stronger than the level of transmission power used for normal ad-hoc communication.

When the terminal #3 receives the information, the terminal #3 stops the use of the infrastructure communication channel CH1 or CH2 for ad-hoc communication, and performs transmission in ad-hoc communication using the ad-hoc communication channel CH3 or CH4. Since the terminal

4 is operable to continue ad-hoc communication using the infrastructure communication channel CH1 or CH2, the terminal #3 continues to receive the infrastructure communication channel CH1 or CH2 from the terminal #4.

Figure 6:
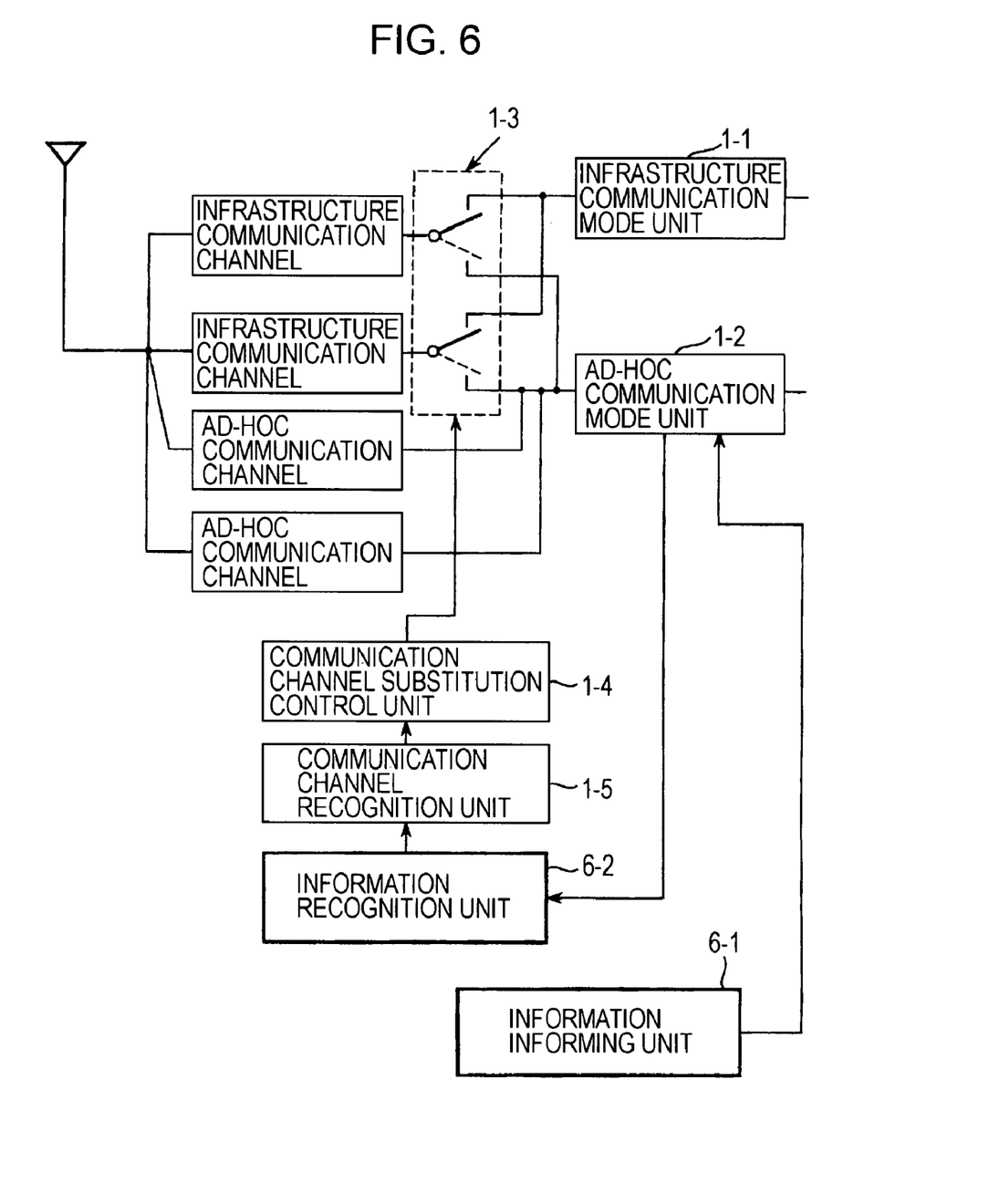
FIG. 6 shows exemplary main functional units of a terminal used in the third embodiment.

FIG. 6 shows main functional units of a terminal used in the third embodiment. The main functional units shown in FIG. 6 are different from the main functional units shown in FIG. 1 in that an information informing unit 6-1 that transmits information indicating that infrastructure communication is being performed and an information recognition unit 6-2 that recognizes information indicating that infrastructure communication is being performed are further provided. When infrastructure communication starts, the information informing unit 6-1 generates information indicating the start of infrastructure communication and transmits the generated information to the ad-hoc communication mode unit 1-2. Then, the ad-hoc communication mode unit 1-2 informs a neighboring terminal of the information via ad-hoc communication.

The information recognition unit 6-2 recognizes information indicating that infrastructure communication is being performed and transmitted from another terminal through the ad-hoc communication mode unit 1-2, and informs the communication channel recognition unit 1-5 of the information. Then, the communication channel recognition unit 1-5 stops the use of an infrastructure communication channel for ad-hoc communication in accordance with the information, and uses an ad-hoc communication channel for ad-hoc communication.

A fourth embodiment of the present apparatus will be described. In the fourth embodiment, similarly to the third embodiment, when the terminal #2 starts infrastructure communication with the base station using an infrastructure communication channel, the terminal #2 informs the neighboring terminal #3 of channel identification information indicating the infrastructure communication channel that is being used for the infrastructure communication using an ad-hoc communication channel. The information transmitted from the terminal #2 using the ad-hoc communication channel is transmitted at a transmission power level stronger than the level of transmission power used for normal ad-hoc communication.

When the terminal #3 receives the information, the terminal #3 stops the use of the infrastructure communication channel CH1 or CH 2 indicated by the channel identification information for ad-hoc communication and performs ad-hoc communication using the ad-hoc communication channel CH3 or CH4 or an available infrastructure communication channel. Since the terminal #4 is capable of continuing ad-hoc communication using the infrastructure communication channel CH1 or CH2, the terminal #3 continues to receive the infrastructure communication channel CH1 or CH2 from the terminal #4.

Figure 7:
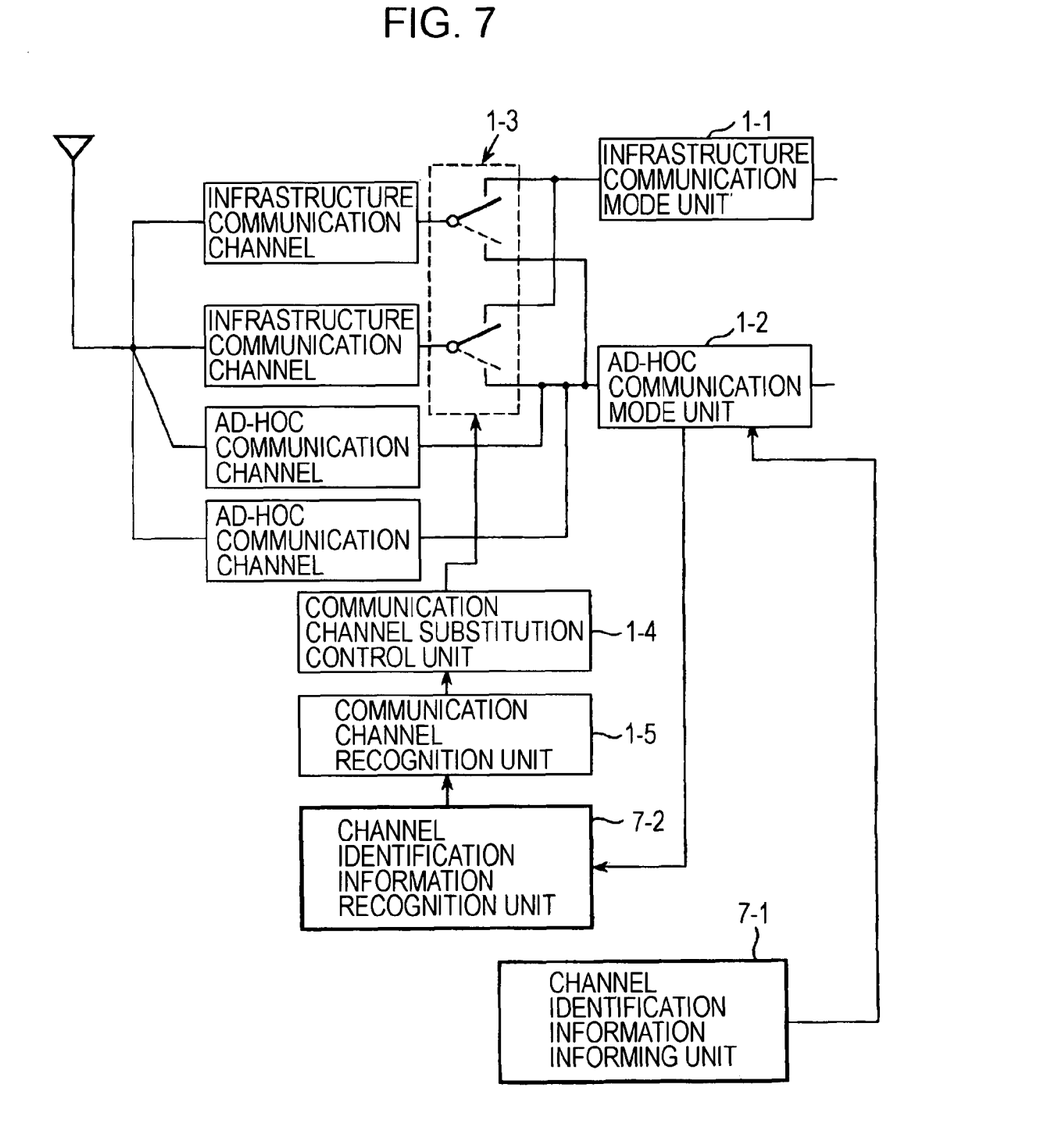
FIG. 7 shows exemplary main functional units of a terminal used in a fourth embodiment of the present apparatus.

FIG. 7 shows main functional units of a terminal used in the fourth embodiment. The main functional units shown in FIG. 7 are different from the main functional units shown in FIG. 6 in that the information informing unit 6-1 and the information recognition unit 6-2 shown in FIG. 6 are replaced with a channel identification information informing unit 7-1 that transmits channel identification information indicating an infrastructure communication channel that is being used and a channel identification information recognition unit 7-2 that recognizes channel identification information indicating an infrastructure communication channel that is being used.

When infrastructure communication starts, the channel identification information informing unit 7-1 informs the ad-hoc communication mode unit 1-2 of channel identification information indicating an infrastructure communication channel that is being used for the infrastructure communication. Then, the ad-hoc communication mode unit 1-2 informs a neighboring terminal of the channel identification information via ad-hoc communication.

The channel identification information recognition unit 7-2 recognizes channel identification information indicating an infrastructure communication channel that is being used and transmitted from a neighboring terminal via the ad-hoc communication mode unit 1-2, and informs the communication channel recognition unit 1-5 of the channel identification information. Then, the communication channel recognition unit 1-5 stops the use of the infrastructure communication channel that is being used by the neighboring terminal for ad-hoc communication, and causes ad-hoc communication to be performed using a different communication channel.

Figure 8:
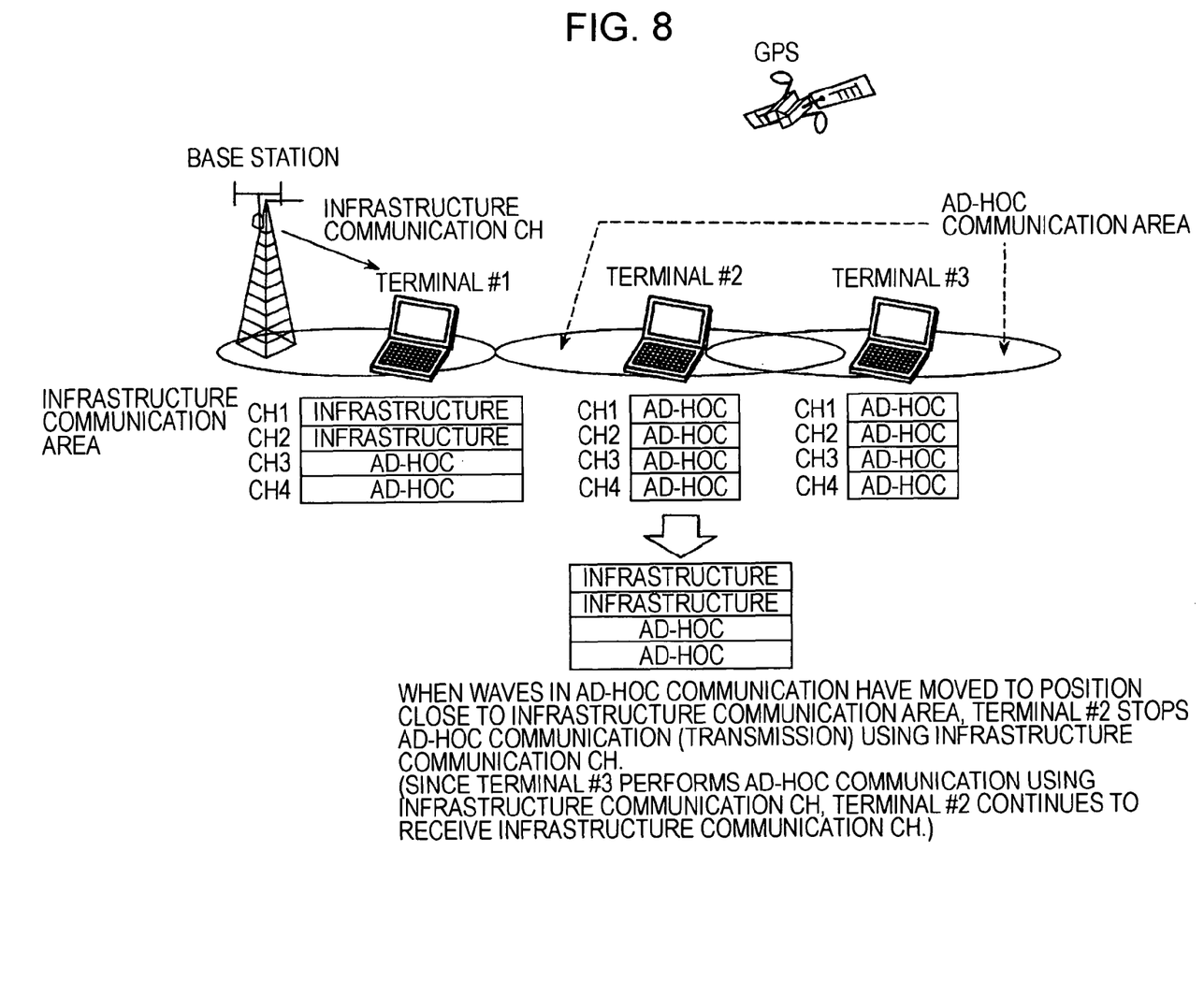
FIG. 8 is an explanatory diagram of a fifth embodiment of the present apparatus.

A fifth embodiment of the present apparatus will be described with reference to FIG. 8. Referring to FIG. 8, the terminal #1 locates within the infrastructure communication area. The terminal #2 locates outside the infrastructure communication area and is approaching the infrastructure communication area. The terminal #3 locates in an area remote from the infrastructure communication area.

Each of the terminals #1 to #3 stores the installation location of each of a plurality of base stations and identification information indicating an infrastructure communication channel that is being used by each of the plurality of base stations. Each of the terminals #1 to #3 also recognizes the positional relationship between the terminal and each of the plurality of base stations using a positioning device, such as a global positioning system (GPS). When each of the terminals #1 to #3 recognizes that the terminal located at a position far enough not to interfere with infrastructure communication in the wireless area of a neighboring base station even if ad-hoc communication is performed by using an infrastructure communication channel for ad-hoc communication, the terminal performs transmission by using the infrastructure communication channel that is being used by the base station for ad-hoc communication.

However, when the terminal recognizes that the terminal is approaching the base station and that infrastructure communication will be interfered with, the terminal stops the use of the infrastructure communication channel for ad-hoc communication. In the example shown in FIG. 8, when the terminal #2 located at a position sufficiently far from the infrastructure communication area, the terminal #2 uses the infrastructure communication channel CH1 or CH2 for ad-hoc communication. Thus, the channels CH1 to CH4 can be used for ad-hoc communication.

However, when the terminal #2 recognizes that it is approaching the infrastructure communication area during the use of the infrastructure communication channel CH1 or CH2 for ad-hoc communication, the terminal #2 stops transmission in ad-hoc communication using the infrastructure communication channel CH1 or CH2 and performs transmission in ad-hoc communication using the ad-hoc communication channel CH3 or CH4. Since the terminal #3 is operable to continue ad-hoc communication using the infrastructure communication channel CH1 or CH2, the terminal #2 continues to receive the infrastructure communication channel CH1 or CH2 from the terminal #3.

Figure 9:
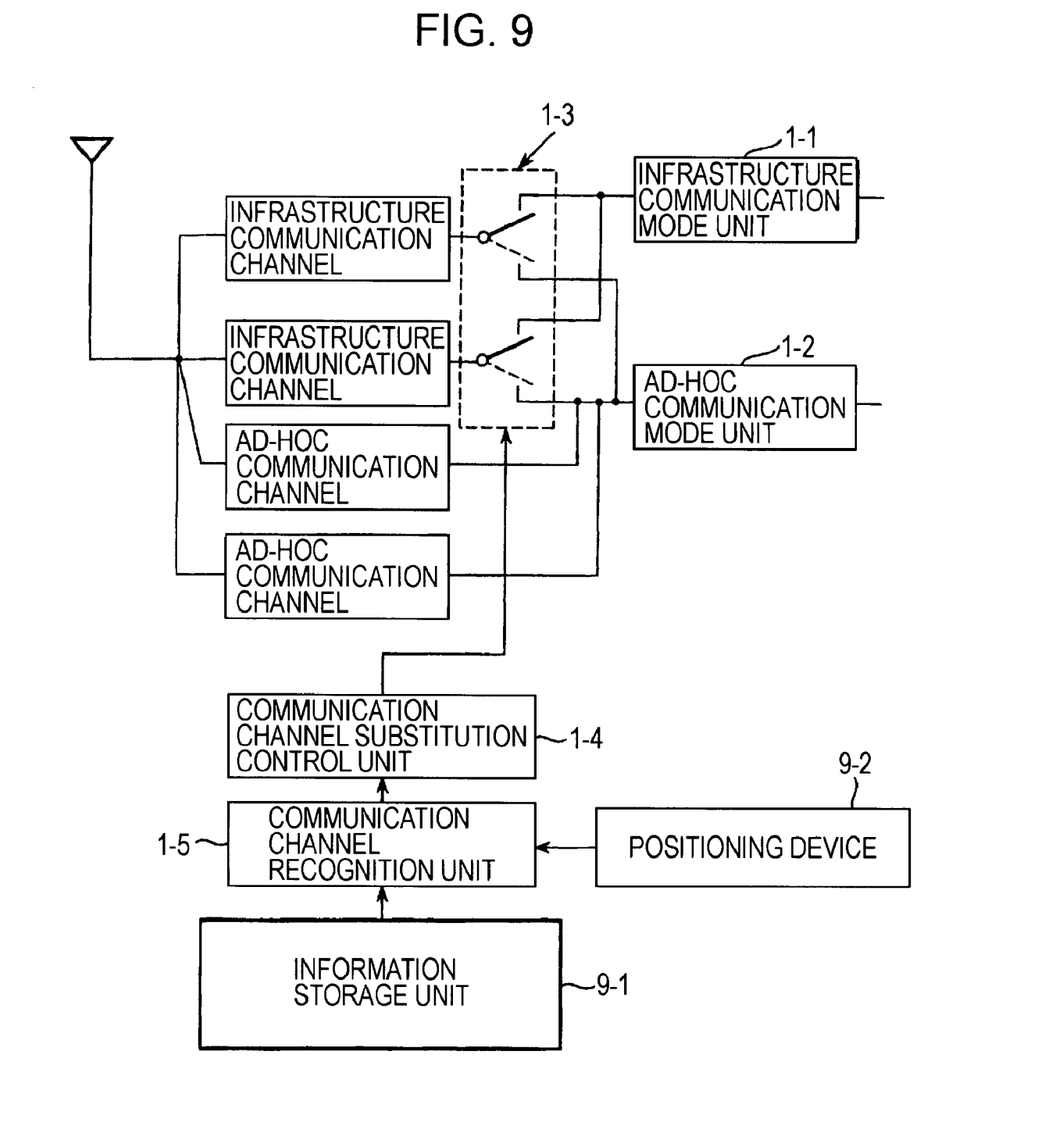
FIG. 9 shows exemplary main functional units of a terminal used in the fifth embodiment.

FIG. 9 shows main functional units of a terminal used in the fifth embodiment. The main functional units shown in FIG. 9 are different from the main functional units shown in FIG. 1 in that an information storage unit 9-1 that stores position information of each of a plurality of base stations and infrastructure communication channel identification information and a positioning device 9-2, such as a GPS, are also included. The information storage unit 9-1 stores in advance position information of each of a plurality of base stations and infrastructure communication channel identification information, and outputs the information to the communication channel recognition unit 1-5.

The positioning device 9-2 acquires present position information of the terminal using a GPS or the like, and transmits the information to the communication channel recognition unit 1-5. The communication channel recognition unit 1-5 recognizes, in accordance with the received information, whether or not the terminal is located in a position where ad-hoc communication performed by the terminal using an infrastructure communication channel interferes with infrastructure communication. If it is determined that infrastructure communication is interfered with, the terminal stops the use of the infrastructure communication channel for ad-hoc communication, and uses an ad-hoc communication channel for ad-hoc communication.

Figure 10:
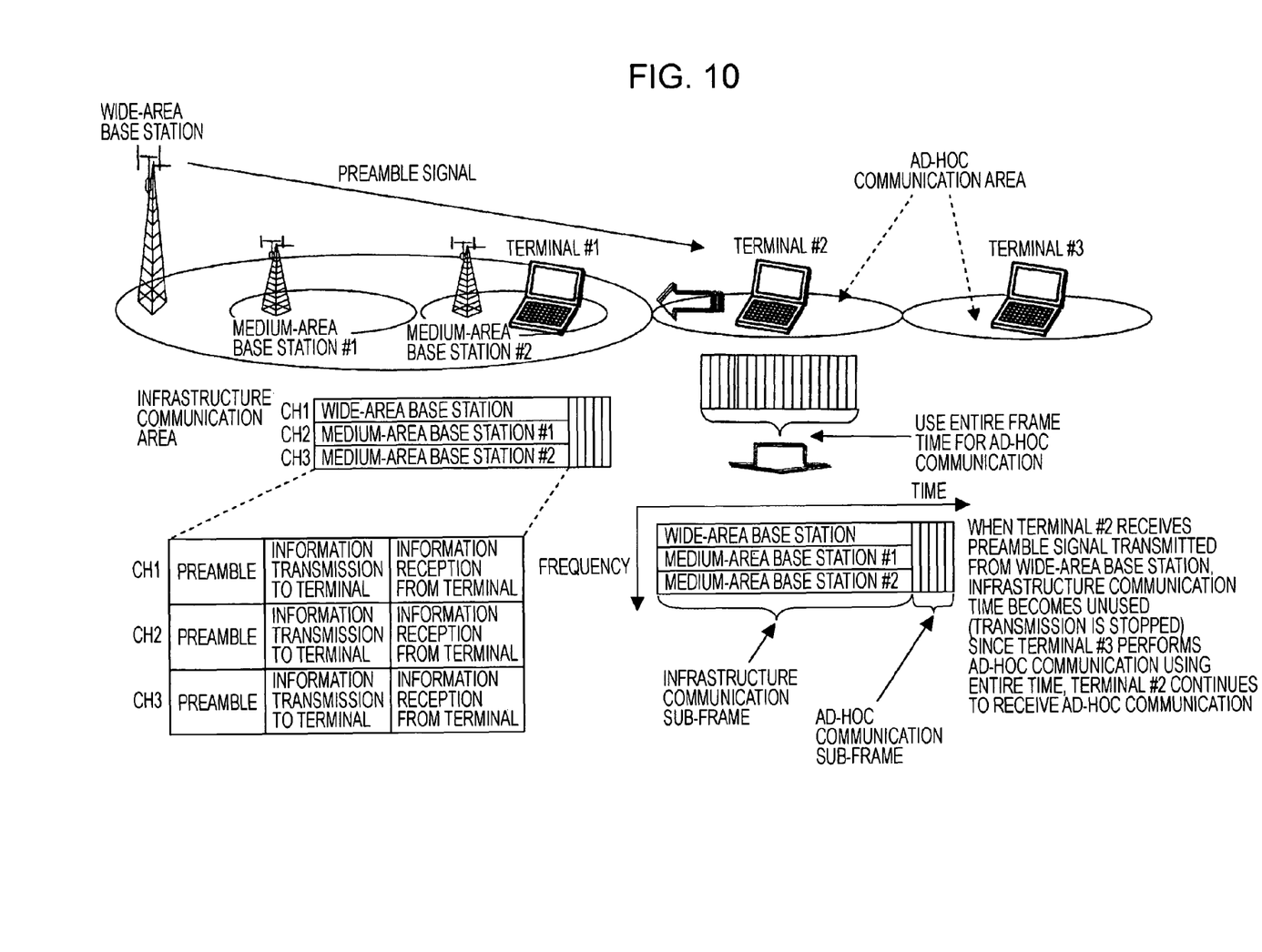
FIG. 10 is an explanatory diagram of a sixth embodiment of the present apparatus.
Figure 11:
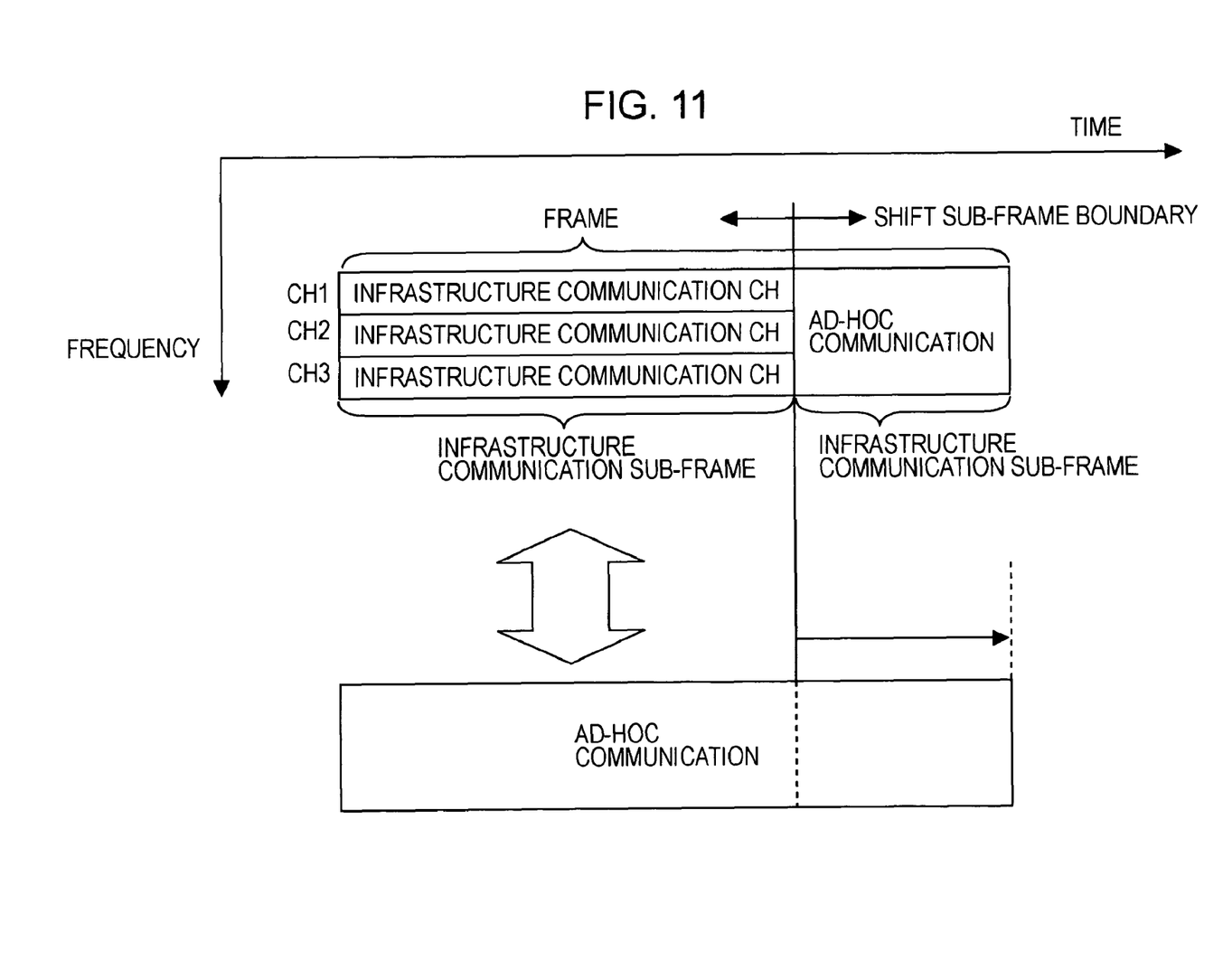
FIG. 11 shows an exemplary channel substitution control method in the sixth embodiment.

A sixth embodiment of the present apparatus will be described with reference to FIG. 10. Referring to FIG. 10, base stations are categorized into wide-area and medium-area base stations depending on the size of the communication area. The terminal #1 may be located within wireless areas of a wide-area base station and a medium-area base station #2. The terminal #2 is located outside the wireless area of the wide-area base station and is approaching the wireless communication area of the wide-area base station. The terminal #3 may be located in an area remote from the wireless area of the wide-area base station. The wireless area of the wide-area base station includes the medium-area base stations #1 and #2. In the sixth embodiment, infrastructure communication and ad-hoc communication are multiplexed, as shown in FIG. 11. That is, within each of repetitive frames each having a certain time length, infrastructure communication and ad-hoc communication are time-division multiplexed by a time zone of infrastructure communication (hereinafter, referred to as an infrastructure communication sub-frame) and a time zone of an ad-hoc communication (hereinafter, referred to as an ad-hoc communication sub-frame). In the infrastructure communication sub-frame, the wide-area base station and the medium-area base stations #1 and #2 shown in FIG. 10 perform communication using sub-channels CH1, CH2, and CH3, respectively, which are different orthogonal frequency division multiple access (OFDMA) sub-channels. Each of the three base stations transmits a signal for allowing a terminal to establish synchronization with the base station (hereinafter, referred to as a "preamble signal") using a sub-channel allocated to the base station, and performs transmission and reception of information to and from the terminal. Substitution of a channel is controlled on the basis of a preamble signal transmitted from the wide-area base station. The terminal performs ad-hoc communication in an ad-hoc communication sub-frame in accordance with autonomous distributed control access method, such as a carrier sense multiple access with collision avoidance (CSMA/CA) method. In the sixth embodiment, a plurality of sub-channels is not provided in an ad-hoc communication sub-frame, unlike the case of infrastructure communication. However, a plurality of sub-channels may be provided in an ad-hoc communication sub-frame by using a technique, such as the orthogonal frequency division multiple access method.

Concerning preamble signals (represented based on a hexadecimal numbering system) transmitted from the wide-area base station and the medium-area base stations, a preamble signal transmitted from the wide-area base station is represented as "0x01E52A9B3," a preamble signal transmitted from the medium-area base station #1 is represented as "0xC96FF8AB1," and a preamble signal transmitted from the medium-area base station #2 is represented as "0xA1F5CE648."

In the wireless communication system according to the sixth embodiment, each of the base stations transmits a preamble signal that can be recognized by all the terminals. With the use of preamble signals that differ depending on the base station, a terminal is operable to identify an individual base station. In addition, a preamble signal transmitted from each of the base stations is different from a preamble signal used in ad-hoc communication. In the vicinity of the boundary between an infrastructure communication area and an ad-hoc communication area, when ad-hoc communication and transmission of a preamble signal from a base station are performed at the same time, a terminal cannot correctly receive the preamble signal transmitted from the base station due to the occurrence of interference. However, if the ad-hoc communication is performed in accordance with a system, such as CSMA/CA, in which a communication wait time for sensing a carrier wave is generated, the terminal is operable to receive the preamble signal transmitted from the base station during the communication wait time. After establishing synchronization with the base station by receiving the preamble signal transmitted from the base station, the terminal receives information transmitted from the base station and transmits information to the base station. Since the terminal #1 is located within the wireless area of the wide-area base station and the wireless area of the medium-area base station #2, the terminal #1 performs infrastructure communication with the wide-area base station and the medium-area base station #2 and performs ad-hoc communication in an ad-hoc communication sub-frame. When the terminal #2 is located at a position sufficiently far from the wireless area of the wide-area base station, since a preamble signal transmitted from the wide-area base station does not reach the terminal #2, the terminal #2 recognizes that using all the frame time zones for ad-hoc communication does not interfere with infrastructure communication performed by the wide-area base station, the medium-area base station #1, and the medium-area base station #2. Thus, all the frame time zones can be used for ad-hoc communication.

Similarly, since a preamble signal transmitted from the wide-area base station does not reach the terminal #3, the terminal #3 recognizes that the terminal #3 is sufficiently far from the infrastructure communication area. Thus, similarly to the case of the terminal #2, the terminal #3 uses all the channel time zones for ad-hoc communication, and, for example, periodically performs ad-hoc communication with the terminal #2.

However, when the terminal #2 enters the area where the preamble signal transmitted from the wide-area base station reaches during the use of an infrastructure communication sub-frame for ad-hoc communication, the terminal #2 recognizes, in accordance with the preamble signal transmitted from the wide-area base station, the use of the infrastructure communication sub-frame for ad-hoc communication interferes with infrastructure communication. Thus, the terminal #2 stops transmission in the ad-hoc communication using the infrastructure communication sub-frame, and performs ad-hoc communication in a time in which the infrastructure communication is not performed, that is, in an ad-hoc communication sub-frame. A terminal recognizes information on the length of an ad-hoc communication sub-frame in accordance with information on a preamble signal or the like transmitted from the wide-area base station and information set in advance inside the terminal.

Since the terminal #3 is operable to continue ad-hoc communication using an infrastructure communication sub-frame, the terminal #2 continues to receive ad-hoc communication from the terminal #3.

Figure 12:
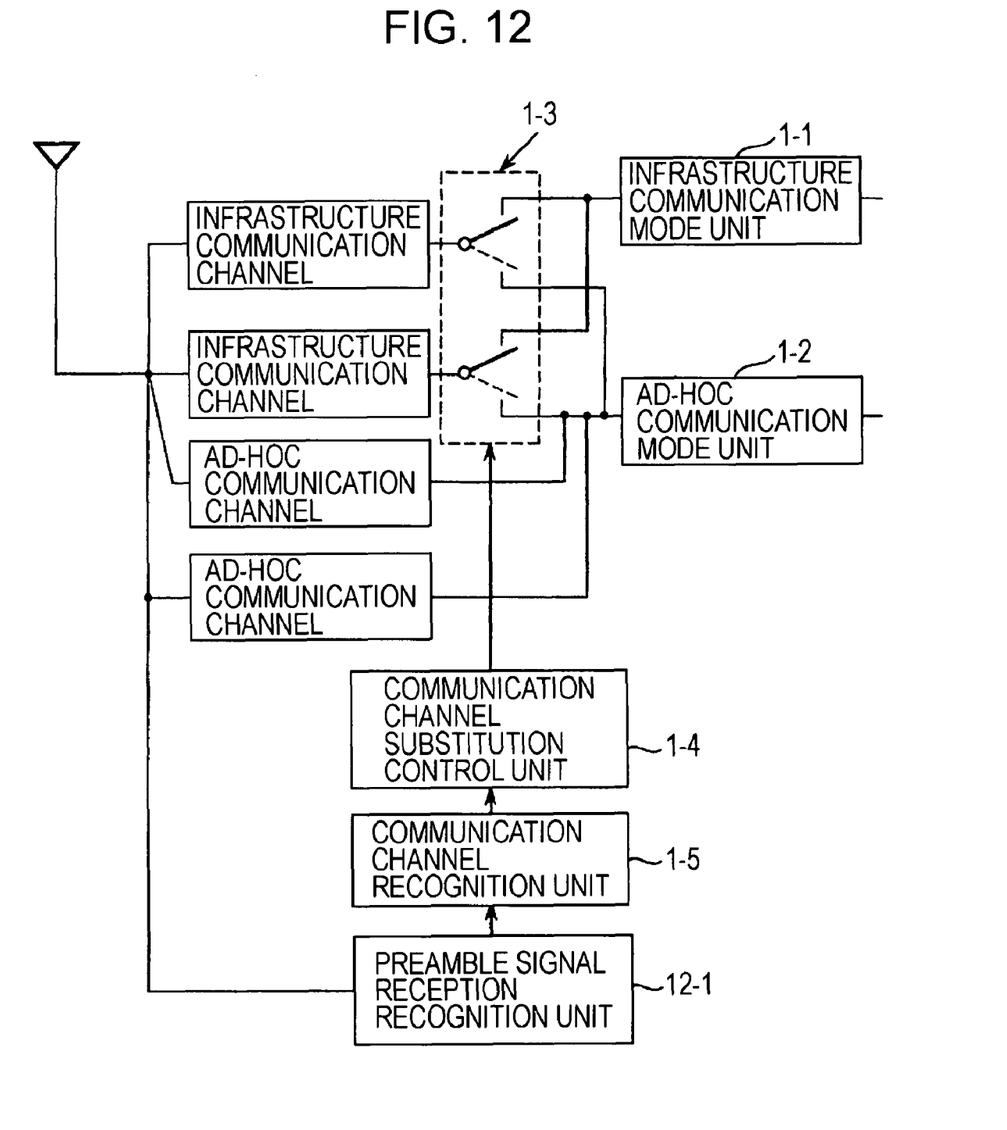
FIG. 12 shows exemplary main functional units of a terminal used in the sixth embodiment.

FIG. 12 shows main functional units of a terminal used in the sixth embodiment. The main functional units shown in FIG. 12 are different from the main functional units shown in FIG. 1 in that a preamble signal reception recognition unit 12-1 is further provided. The preamble signal reception recognition unit 12-1 recognizes, in accordance with reception of a preamble signal transmitted from the wide-area base station, that the wide-area base station exists near the terminal, and informs the communication channel recognition unit 1-5 of information indicating the recognition of the existence of the wide-area base station. If the received preamble signal includes information on the length of an infrastructure communication sub-frame, the terminal also informs the communication channel recognition unit 1-5 the information on the length of the infrastructure communication sub-frame. When receiving from the preamble signal reception recognition unit 12-1 the information indicating the reception of the preamble signal, the communication channel recognition unit 1-5 transmits to the communication channel substitution control unit 1-4 switching control information indicating switching of an infrastructure communication channel from the ad-hoc communication mode unit 1-2 to the infrastructure communication mode unit 1-1. When receiving the switching control information, the communication channel substitution control unit 1-4 transmits to the selector switch 1-3 a control signal for switching the infrastructure communication channel from the ad-hoc communication mode unit 1-2 to the infrastructure communication mode unit 1-1. When the selector switch 1-3 receives the control signal for switching, the selector switch 1-3 performs switching of the infrastructure communication channel from the ad-hoc communication mode unit 1-2 to the infrastructure communication mode unit 1-1. In response to the switching, the ad-hoc communication using the infrastructure communication sub-frame is stopped.

In addition, when the reception of the preamble signal transmitted from the wide-area base station is completed, the preamble signal reception recognition unit 12-1 informs the communication channel recognition unit 1-5 of the completion of the reception of the preamble signal. When the communication channel recognition unit 1-5 receives the information indicating the completion of the reception of the preamble signal from the preamble signal reception recognition unit 12-1, the communication channel recognition unit 1-5 transmits to the communication channel substitution control unit 1-4 switching control information indicating switching of the infrastructure communication channel from the infrastructure communication mode unit 1-1 to the ad-hoc communication mode unit 1-2. When the communication channel substitution control unit 1-4 receives the switching control information, the communication channel substitution control unit 1-4 transmits to the selector switch 1-3 a control signal for switching the infrastructure communication channel from the infrastructure communication mode unit 1-1 to the ad-hoc communication mode unit 1-2. When the selector switch 1-3 receives the control signal for switching, the selector switch 1-3 performs switching of the infrastructure communication channel from the infrastructure communication mode unit 1-1 to the ad-hoc communication mode unit 1-2. In response to the switching, the ad-hoc communication using the infrastructure communication sub-frame is resumed.

In addition, by transmitting a preamble signal with a high transmission power, ad-hoc communication using an infrastructure communication sub-frame can be stopped at a position remote from the wide-area base station.

Although methods for controlling the start and end timings of substitution of a communication channel have been explained individually in the foregoing embodiments, a plurality of methods may be combined together in order to achieve a higher reliability in the substitution control for a communication channel.

What is claimed is:

1. A mobile communication apparatus operable to perform a infrastructure wireless communication via a base station and a ad-hoc wireless communication directly communicating with a different mobile communication apparatus, comprising:
   a communication channel recognition unit that recognizes a infrastructure communication channel which does not interfere with the infrastructure communication within a wireless area of the base station among a plurality of infrastructure communication channels allocated for the infrastructure communication; and
   a communication channel substitution controller operable to switch a channel used for the ad-hoc communication to the infrastructure communication channel recognized by the communication channel recognition unit, wherein the ad-hoc communication uses the infrastructure communication channel;
   wherein the communication channel recognition unit recognizes a infrastructure communication channel that can be used for ad-hoc communication in accordance with a reception state of a synchronization establishing signal transmitted from the base station or channel identification information indicated by the synchronization establishing signal.

2. A channel switching method for performing communication in a infrastructure communication in which the mobile communication apparatus performs wireless communication via a base station and a ad-hoc communication in which the mobile communication apparatus directly performs wireless communication with a different mobile communication apparatus, comprising:
   (a) recognizing a infrastructure communication channel that does not interfere with the infrastructure communication performed within a wireless area of the base station among a plurality of infrastructure communication channels allocated for the infrastructure communication; and
   (b) controlling such that a channel used for ad-hoc communication is switched to the infrastructure communication channel recognized in the step (a) and the ad-hoc communication uses the infrastructure communication channel;
   wherein the recognizing recognizes a infrastructure communication channel that can be used for ad-hoc communication in accordance with a reception state of a synchronization establishing signal transmitted from the base station or channel identification information indicated by the synchronization establishing signal.

3. A mobile communication apparatus operable to perform communication in a infrastructure communication mode via a base station and a second ad-hoc communication mode directly communicating with a different mobile communication apparatus, comprising:
   a communication channel recognition unit that recognizes an unused channel for the infrastructure communication mode that does not interfere with communication in the infrastructure communication mode performed within a wireless area of the base station among a plurality of channels for the infrastructure communication mode; and a communication channel substitution controller that switches a channel used for the ad-hoc communication mode to the unused channel for the infrastructure communication mode recognized by the communication channel recognition unit, wherein the communication in the ad-hoc communication mode uses the usused channel for the infrastructure communication mode;

wherein the communication channel recognition unit recognizes a infrastructure communication channel that can be used for ad-hoc communication in accordance with a reception state of a synchronization establishing signal transmitted from the base station or channel identification information indicated by the synchronization establishing signal.

\* \* \* \* \*